United States Patent [19]

Jones et al.

[11] 4,042,225
[45] Aug. 16, 1977

[54] TORCH WITH GAS ACTUATED STARTING ROD FEED DEVICE

[75] Inventors: Richard Calvin Jones, Scio, Ohio; Clifford Charles Anthes, Tucson, Ariz.

[73] Assignee: Union Carbide Corporation, New York, N.Y.

[21] Appl. No.: 724,359

[22] Filed: Sept. 17, 1976

[51] Int. Cl.² .............................................. B23K 7/10
[52] U.S. Cl. ...................................... 266/75; 148/9 C
[58] Field of Search ................. 148/9 R, 9 C, 9.5, 9.6; 266/75

[56] References Cited

U.S. PATENT DOCUMENTS 2,433,514  12/1947  Hughey ................................... 266/75

FOREIGN PATENT DOCUMENTS 970,458  9/1964  United Kingdom .................... 266/75

Primary Examiner—Gerald A. Dost
Attorney, Agent, or Firm—Dominic J. Terminello

[57] ABSTRACT

A gas actuated starting rod feed device for use with hand holdable oxygen cutting and/or scarfing torches. The starting rod feed device includes means for gripping and advancing a starting rod. The gripping means is operated in response to the stroke of a piston-like member which is actuated by a pulse of oxygen diverted from the main oxygen stream. The oxygen gas is vented to atmosphere at the end of the piston stroke so that the starting rod feed device is automatically reset and so that there is no pressurized oxygen present during the cutting or scarfing operation in the vicinity of the flame issuing from the torch.

4 Claims, 4 Drawing Figures

TORCH WITH GAS ACTUATED STARTING ROD FEED DEVICE

This invention relates to scarfing and/or cutting torches and more particularly to a gas actuated rod feed mechanism associated with such torches for feeding a starting rod into the flame jets issuing from the torch nozzle to effect quicker starts of the scarfing or cutting operation.

Rod feed devices have been used for many years. The prior art has proposed many starting rod feed devices. Some devices are actuated mechanically by linkage connected to the torch lever that actuates the cutting oxygen. Other devices are actuated by fluid pressure wherein oxygen from the main oxygen system is used as the actuating fluid. This invention is concerned with an improved gas actuated starting rod feed device.

U.S. Pat. No. 2,433,514 issued to H. G. Hughey discloses a gas operated starting rod feed device which this invention improves upon. The Hughey device has been available since 1947 but, because of several shortcomings, mechanical systems are still used in a majority of situations. This in spite of the fact that mechanical systems have a multiplicity of cams, levers, and springs requiring constant adjustment and maintenance because of wear, and require considerable added force in operating torch cutting levers. The added operating force of course is fatiguing and a constant source of operator complaint. Previous gas operated rod feed systems, as exemplified by Hughey, have required complicated oxygen valving to supply oxygen to the rod feed mechanism and to exhaust such oxygen. In addition to the valving complications, this type of system results in pressurized oxygen being present in the vicinity of the hot reaction zone during the entire scarfing or cutting operation. This of course is a hazardous situation which is undesirable.

According to this invention the necessity for complicated oxygen valving is eliminated by utilizing a piston-like member actuated by a pulse of oxygen tapped from the main oxygen stream by a simple auxiliary oxygen valve arrangement. The oxygen is vented to atmosphere at the end of the piston stroke thereby automatically resetting the rod feed mechanism for the next cycle. This feature eliminates the need for the valve arrangement of the prior art and also eliminates the presence of pressurized oxygen in the vicinity of the flame during operation.

The invention will be more particularly described in conjunction with the accompanying drawings wherein.

Figure 1:
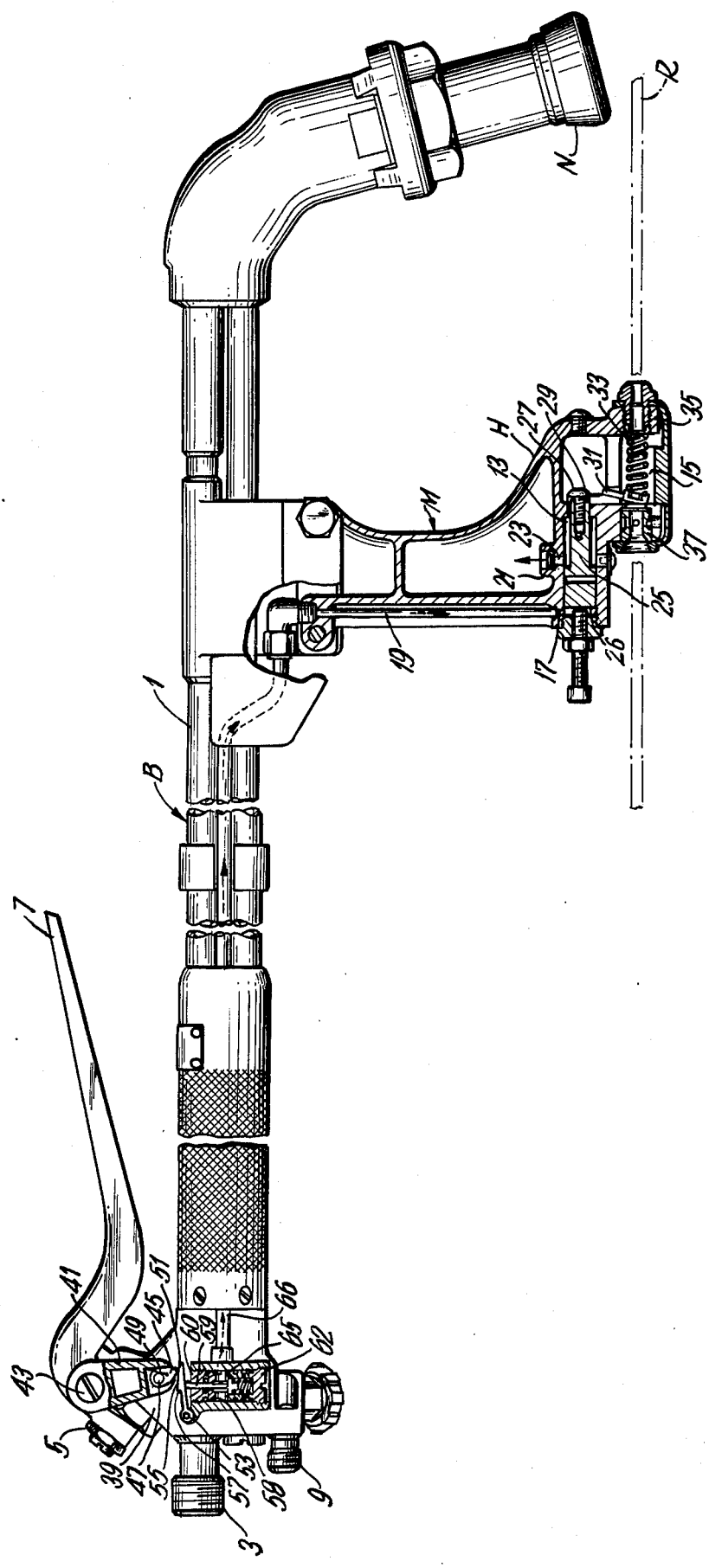
FIG. 1 is a front elevation view partially in cross section of a typical torch incorporating the rod feed mechanism of the invention.
Figure 4:
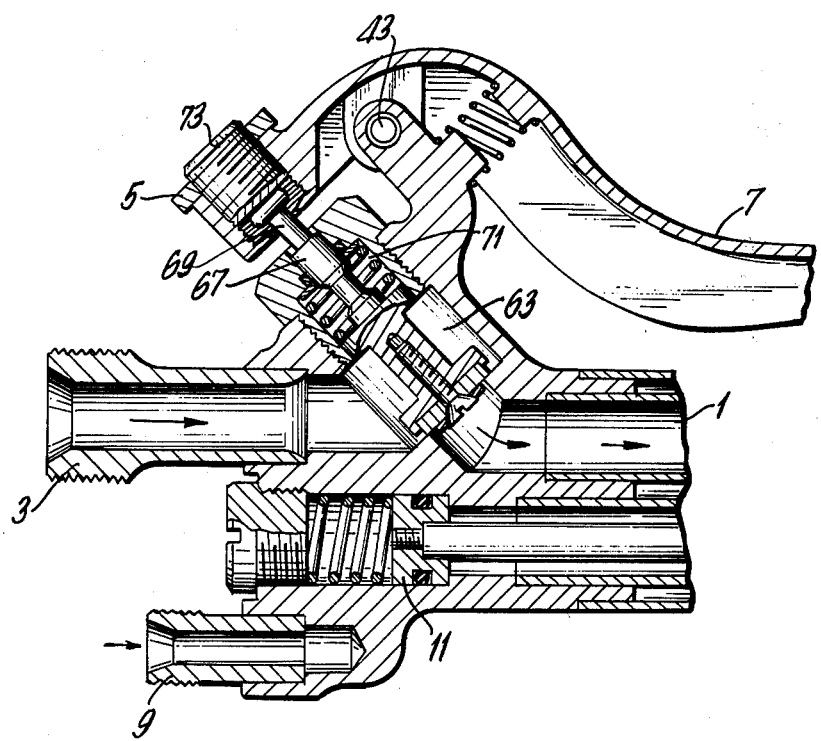
FIG. 4 is a side cross sectional view of the rear of the torch shown in FIG. 1.

Referring now to the drawings and particularly FIGS. 1 and 4, the apparatus shown therein comprises an oxy-fuel gas, such as natural gas or acetylene, torch B upon which is mounted an improved starting rod feed mechanism M near the forward portion thereof to feed incremental lengths of a fusible and oxidizable metal rod R into the preheat jets discharged by the nozzle N of the torch B.

The torch B has a main oxygen gas passage 1 which terminates at one end in a gas nipple 3 adapted to be connected to a source of cutting oxygen. A main oxygen valve 5 (see FIG. 4) is positioned in the first gas passage 1 for permitting the flow of oxygen from the source thereof to nozzle N through the gas passage 1. The main oxygen valve 5 is connected to and operated by the torch lever 7. Fuel gas, such as natural gas or acetylene, enters the torch B through inlet passage 9 and mixes with oxygen in mixer 11. The cutting oxygen issues in the usual way from a central orifice (not shown) in the nozzle N and the preheat jets issue from orifices surrounding the cutting oxygen orifice.

The rod feed mechanism M comprises a housing H having parallel chambers 13 and 15. One chamber 13 has an opening 17 providing communication between second gas passage 19 and one end of said chamber 13. Remotely located from opening 17, in the wall of chamber 13, is an exhaust port 21. Exhaust port 21 is provided with a filter 23 for preventing dust or other debris from entering chamber 13. A piston-like member 25 is slideably located in chamber 13.

The stroke of the piston is determined by the distance from the end 26 of the piston and exhaust port 21. The stroke of the piston may be adjusted by adjusting screw member 27 or by selected pistons which are machined to provide different distances from end 26 to port 21. The end 29 of piston 25 is mechanically connected to a rod gripper 31 which is located in chamber 15. A spring member 33 is located between gripper 31 and the wall 35 of chamber 15 for returning the gripper to its starting position at the end of a rod feed stroke. A rod R is fed through a friction guide member 37 out to the flame jet end of the nozzle N by the forward movement of rod gripper 31 as the piston 25 moves forward.

The means for providing actuating gas to the opening 17 in chamber 13 includes the torch lever 7 pivotally mounted at 43 to the torch body 39. A lever arm extension 41 is pivotally secured at 43 to lever 7. A cam operator 45 is pivotally secured at 47 to lever arm extension 41. A spring member 49 is provided between cam operator 45 and lever arm extension 41 for urging said operator 45 against the wall of lever arm extension 41. A cam lever 51 is pivotally secured at 53 to the torch body 39. Cam lever 51 has an upwardly sloped ramp surface 55 on which cam operator 45 rides when torch lever 7 is depressed. Ramp surface 55 abruptly terminates in a downwardly sloped surface 57. This geometry of cam operator 45 permits the cam operator to drive the cam lever 51 into contact with the valve stem 59 of the valve 58. When cam operator 45 rides past the ramp surface 55 the valve stem 59 immediately returns to the closed position. As the torch lever continues through a normal cycle the cam operator is urged against the force of spring 49, as the torch lever is released, by the surface 57 so that the cam operator will not operate the valve stem as cam operator returns to its initial position.

Figure 2:
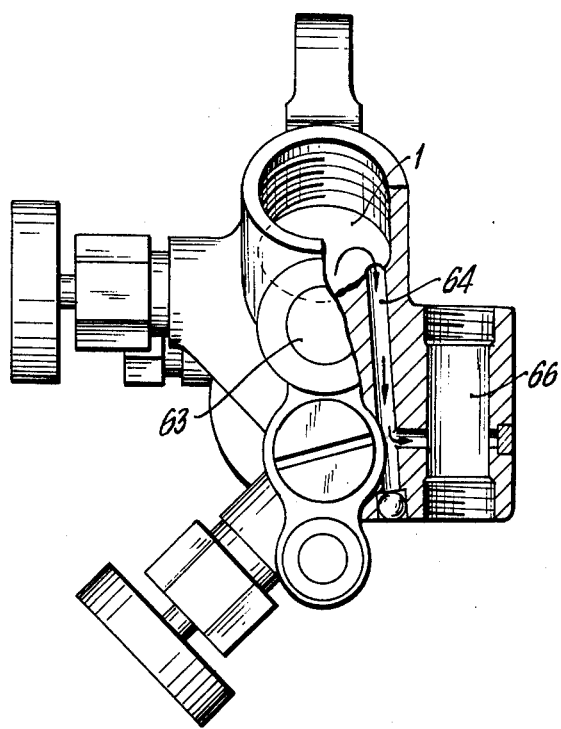
FIG. 2 is a partial perspective view of the back side of the torch body (without parts) shown in FIG. 1.
Figure 3:
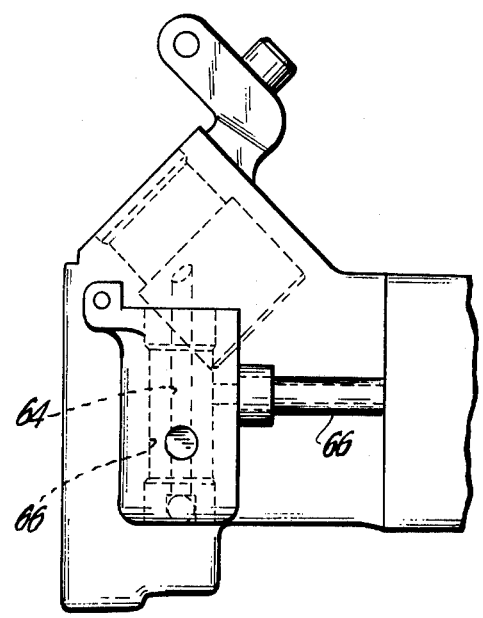
FIG. 3 is a partial view of the rear portion of the torch body showing gas passages in phantom.

The auxiliary valve member 58 is located in the torch body 39 in the gas passage 19 and includes the valve stem 59. The valve 58 is held in the body by screw members 60 and 62. These screw members permit vertical adjustment of the valve 58 to compensate for wear on valve stem 59. In operation, main oxygen is supplied to the torch B through gas nipple 3. Oxygen fills chamber 63 and passage 64 (see FIG. 2) which is an extension of gas passage 19. As the torch lever 7 is depressed, lever arm extension 41 drives cam operator 45 into contact with cam lever 51. Cam lever 51 contacts valve stem 59 and depresses the valve stem 59 thereby permitting oxygen to flow from gas passage 64 through the valve body 65 into gas passage 19 by way of passage 66. As the cam operator 45 reaches the top of ramp surface 55 the torch lever begins to open main oxygen valve 67 by gripping the stem 69 and lifting the valve body 71 so that oxygen may flow from chamber 63 into first gas passage 1. The opening of main oxygen valve 67 may be adjusted by screw adjustment 73 so that main oxygen will flow just after the pulse of oxygen is provided to the rod feed mechanism M to actuate the advance of the starting rod R. The gas pulse provided to passage 19 is introduced into chamber 13 through opening 17 and drives the piston 25 forward. Piston 25 in turn drives the rod gripper 31 forward. As the rod gripper 31 moves forward it grips the rod R and advances it a distance approximately equal to the stroke of the piston 25. At the end of the stroke the actuating oxygen is exhausted to atmosphere through exhaust port 21. Spring 33 drives the rod gripper rearwardly, which in turn returns the piston to its starting position. Friction guide member 37 prevents the rod from being driven in the rearward direction.

It will be noted from the foregoing detailed description that the action of the auxiliary valve member 58 is such that upon release of the torch lever 7, cam operator 45 on lever arm extension 41 moves from left to right and the cam operator is rotated clockwise against the force of the spring 49 so as to ride over the ramp surface 55 of cam lever 51 without opening the valve 58. This action is necessary otherwise the rod would feed on the return of the torch lever to the start position, an obviously undesirable condition.

Operational features of the present invention over mechanical rod feed device are 1. Lower manual force required to operate torch lever; 1 lb. vs 13 lbs. to feed rod, 7 lbs. vs 15 lbs. to open cutting oxygen valves, and 2 lbs. vs 8 lbs. to hold oxygen valve wide open.

2. In line application of force to feed rod minimizes points of sliding friction, thus reducing wear and assuring positive feed of rod.

3. The movement of the piston is in the same direction and parallel with the movement of the rod as it is advanced, and the centerline of the piston with respect to centerline of the rod being fed is held to a reasonably low value of offset, both factors being instrumental in reducing friction and side thrust of forces to a minimum.

4. Reduced number of friction and wear points involved in driving rod toward nozzle, thus reducing required force to move rod and amount of wear and subsequent maintenance; 5 points of sliding friction against 9, and 3 points of pivotal friction against A.

We claim:

1. A hand holdable gas torch, comprising a torch body having a first gas passage therein providing communication between a source of gas and a torch nozzle mounted at one end of said torch body, a starting rod feed mechanism mounted on said torch body and comprising a housing having an exhaust port therein; a piston in said housing sealing said exhaust port; a rod gripper connected to said piston for parallel movement therewith; second gas passage means providing communication between one side of said piston and said first gas passage; valve means located in said second gas passage for providing a pulse of gas to said piston, said valve means having a valve stem for opening said valve; means for operating said valve means in one direction only, including a torch lever pivotally mounted to the torch body, a lever arm extension pivotally mounted to said torch lever; a cam operator pivotally and resiliently mounted at one end of said lever arm extension; a cam lever pivotally mounted to the torch body and in operable relationship to said cam operator so that only when said torch lever is depressed the cam operator drives the cam lever into contact with said valve stem causing a pulse of gas to flow through said second gas passage to one side of said piston thereby driving said piston until said exhaust port is opened whereupon said pulse of gas is exhausted to atmosphere so that the rod advances the starting rod a distance equal to the stroke of the piston and the rod gripper is immediately reset for another stroke.

2. A torch according to claim 1 wherein said cam lever has an upwardly sloped ramp surface on which the cam operator rides when the torch lever is depressed to drive the cam lever into contact with said valve stem, said ramp surface abruptly terminating in a downward sloped surface so that the resiliently mounted cam operator will permit the cam lever to release the valve stem thereby immediately closing the valve means and so that on the return stroke the resiliently mounted cam operator will rotate upon contacting the downwardly sloped surface so as to prevent opening of the valve means on said return stroke.

3. The combination with a gas torch having a passage for the flow of gas to issue from the torch nozzle; of a gas operated starting rod feed mechanism supported by the torch; said rod feed mechanism comprising a rod feed housing having substantially parallel chambers; a rod feed assembly in one chamber, said assembly having a rod gripper for advancing a starting rod, a piston located in the other chamber and mechanically connected to said rod gripper, said other chamber having an exhaust port sealed by said piston when said piston is in its starting position, means for supplying gas from said passage to said piston so that the piston will be actuated by such gas until it reaches the end of its stroke whereupon said exhaust port is opened and the gas is exhausted to atmosphere and the rod feed mechanism advances the starting rod a distance equal to the stroke of said piston.

4. The combination according to claim 3 wherein a resilient member is provided in said one chamber between said rod gripper and said chamber wall to drive said rod gripper to its starting position when said gas is exhausted to atmosphere.

* * * * *